No. 626,482. Patented June 6, 1899.
E. BRESLAUER.
AUTOMATIC MUSIC BOX WITH INTERCHANGEABLE MUSIC DISKS.
(Application filed Oct. 28, 1898.)
(No Model.)
Fig.1.
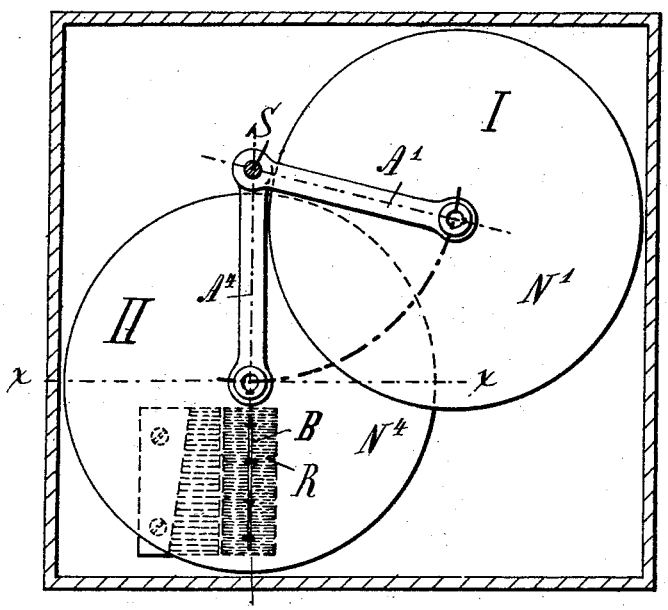
Fig.2.
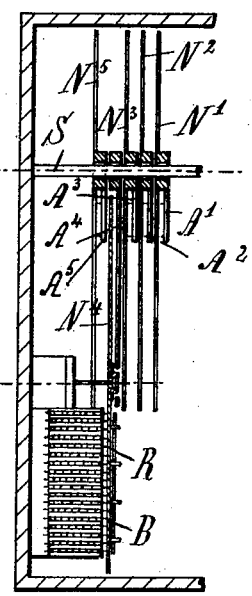
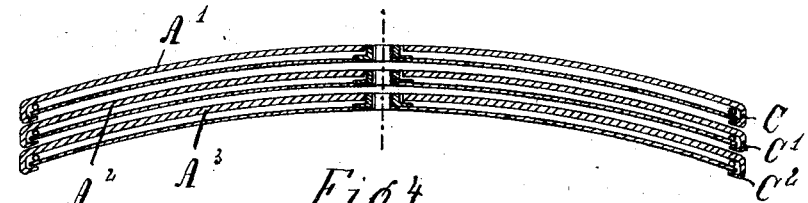
Fig.4.
Fig.3.
Witnesses:
G. W. Eisenbraun
E. P. Hendrickson
Inventor:
Eduard Breslauer
by A. Faber du Faur Jr.
Atty.

UNITED STATES PATENT OFFICE.

EDUARD BRESLAUER, OF LEIPSIC, GERMANY, ASSIGNOR TO THE SYMPHONION MANUFACTURING COMPANY, OF NEW YORK, N. Y.

AUTOMATIC MUSIC-BOX WITH INTERCHANGEABLE MUSIC-DISKS.

SPECIFICATION forming part of Letters Patent No. 626,482, dated June 6, 1899.

Application filed October 28, 1898. Serial No. 694,785. (No model.)

*To all whom it may concern:*

Be it known that I, EDUARD BRESLAUER, civil engineer, a subject of the Emperor of Germany, residing at 7 Goethestrasse, Leipsic, German Empire, have invented certain new and useful Improvements in and Connected with Automatic Music-Boxes with Interchangeable Music-Disks; and I do hereby declare the following to be a full, clear, and exact description of the invention, such as will enable others skilled in the art to which it appertains to make and use the same, reference being had to the accompanying drawings, and to the letters of reference marked thereon, which form part of this specification.

My invention relates to improvements in automatic music-boxes, and more especially to that class of music-boxes in which circular music sheets or disks are revolved above the toothed wheels for picking the reeds.

The aim of the invention is to allow of any desired music sheet or disk to be brought into contact with the picking-wheels. For this purpose each individual music-disk is arranged in a swinging arm or bearing, which is adapted to be swung forward and backward far enough as to bring the music-disk into or out of contact with the picking-wheels.

In order to make my invention more easily understood, I have illustrated it on the accompanying sheet of drawings, of which—

Figure 1 represents a plan view of the arrangement. Fig. 2 is a sectional view on line $xx$ of Fig. 1. Fig. 3 is a detail sectional view of a number of music-disks with the swinging arms. Fig. 4 is a sectional view of a number of bent music-disk holders.

The swinging bearings consist of arms $A'$ $A^2$ $A^3$, pivotally fastened upon a pin or shaft S and free to slide on said shaft. The other swinging end of the arm is provided with a hole to receive a bush $a'$ $a^2$ $a^3$, fastened to the center of the music-disk $N'$ $N^2$ $N^3$, which hole is of such a diameter as to allow of the free rotary motion of the music-disk. The said bushes are provided with a collar or flange $b'$ $b^2$, which serves the purpose of raising the music-disk enough so as to allow of the bent-down teeth for actuating the picking-wheels to pass over the swinging arm when the music-disk is being rotated.

It is clear that any desired music-disk may be brought above the picking arrangement R by sliding the arms on the shaft S to the proper position, and then journaling this particular music-disk around from the position I to the position II, Fig. 1. The music-disk may be revolved by any desired means, by teeth being arranged on the circumference or by slots being stamped out of the disk near the circumference and a toothed wheel of the clockwork engaging the said teeth or slots.

In the arrangement shown in Figs. 1 and 2 the music-disk holder B has to be lifted a little, so as to allow of the music-disk being introduced between the picking-wheel holder R and the music-disk holder B. By pressing down the music-disk holder B the music-disk is then brought into engagement with the clockwork.

As shown in Fig. 4, each music-disk may be placed into a bent or dished disk-holder C C'. The music-disks are thus kept in a certain tension, which is of great advantage for preventing slippage of the revolving disk.

Having now particularly described and ascertained the nature of my said invention and in what manner the same is to be performed, I declare that what I claim is—

1. In an automatic music-box with interchangeable music-disks a series of swinging arms, each one journaling at its free end a revoluble music-disk, said arms being pivotally secured upon a common shaft, as and for the purpose set forth.

2. In an automatic music-box with reeds and picking-wheel mechanism in combination the swinging arms $A'$, $A^2$, the music-disks $N'$, $N^2$ journaled in the said swinging arms, the bushings $a'$, $a^2$, having collars or flanges $b'$, $b^2$ whereby the disks are journaled in the swinging arms and the shaft S, being the pivot for the said swinging arms, the parts being arranged substantially as and for the purpose set forth.

In testimony that I claim the foregoing as my invention I have signed my name, in presence of two witnesses, this 21st day of September, 1898.

EDUARD BRESLAUER.

Witnesses:
GUSTAV RIPKE,
RUDOLPH FRICKE.